(12) United States Patent
Ohora

(10) Patent No.: US 11,209,370 B2
(45) Date of Patent: Dec. 28, 2021

(54) METHOD AND SYSTEM FOR REAL-TIME WEB MANUFACTURING SUPERVISION

(71) Applicant: ABB Schweiz AG, Baden (CH)

(72) Inventor: Michael Ohora, Greenore (IE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/772,954

(22) PCT Filed: Dec. 5, 2018

(86) PCT No.: PCT/EP2018/083669
§ 371 (c)(1),
(2) Date: Jun. 15, 2020

(87) PCT Pub. No.: WO2019/121021
PCT Pub. Date: Jun. 27, 2019

(65) Prior Publication Data
US 2021/0164912 A1    Jun. 3, 2021

(30) Foreign Application Priority Data
Dec. 23, 2017  (EP) ..................................... 17020593

(51) Int. Cl.
*G01N 21/89*    (2006.01)
*G01J 3/427*    (2006.01)
(Continued)

(52) U.S. Cl.
CPC .......... *G01N 21/8901* (2013.01); *G01J 3/427* (2013.01); *G01N 21/3559* (2013.01); *G01N 21/86* (2013.01); *G01N 2021/8645* (2013.01)

(58) Field of Classification Search
CPC ........... G01N 21/8901; G01N 21/8903; G01N 21/274; G01N 21/8851; G01N 21/896;
(Continued)

(56) References Cited

U.S. PATENT DOCUMENTS 5,124,552 A   6/1992  Anderson
5,438,406 A   8/1995  Puschell
(Continued)

FOREIGN PATENT DOCUMENTS

WO    WO-2015081130 A1 *  6/2015  ......... B81C 1/00317

OTHER PUBLICATIONS

Extended European Search Report Application No. EP 17 02 0593 Completed: May 28, 2018; dated Jun. 6, 2018 7 pages.
(Continued)

*Primary Examiner* — Michael P Stafira
(74) *Attorney, Agent, or Firm* — Whitmyer IP Group LLC

(57) ABSTRACT

A web manufacturing supervision system for monitoring properties of a web being transported in a moving direction during a web manufacturing process, includes: a) a radiation source for illuminating a first spot on the web; b) a tunable first detector for capturing signal radiation emanating from the first spot within a signal wavelength band; the signal wavelength band being adjustable to one of at least a first wavelength band and a second wavelength band; c) a second detector for capturing reference radiation emanating from the first spot within a reference wavelength band; d) control means for alternatingly tuning the signal wavelength band to the first wavelength band and the second wavelength band and measuring the signal at both wavelength bands simultaneously.

16 Claims, 1 Drawing Sheet

(51) Int. Cl.
 *G01N 21/3559* (2014.01)
 *G01N 21/86* (2006.01)
(58) Field of Classification Search
 CPC ........... G01N 21/93; G01N 2021/8867; G01N 2021/8917; G01N 21/8806; G01N 21/8983; G01N 2021/8887; G01N 21/8915; G01N 21/894; G01N 2021/8427; G01N 2021/8861; G01N 2021/8864; G01N 2021/888; G01N 2021/8908; G01N 21/27; G01N 21/8422; G01N 21/892; G01N 21/952; G01N 21/958; G01N 2201/12; G01N 2021/8438; G01N 2021/8905; G01N 2021/8909; G01N 2021/8967; G01N 21/3559; G01N 21/359; G01N 21/8916; G01N 21/898; G01N 21/95; G01N 27/205; G01N 27/92; G01N 33/36; G01N 21/3504; G01N 21/39; G01N 21/4795; G01N 21/255; G01N 21/314; G01N 2201/061; G01N 21/31; G01N 21/17; G01N 2021/317; G01N 2021/3513; G01N 2201/0693; G01N 2201/0696; G01N 2201/128; G01N 21/35; G01N 2021/1787; G01N 21/49; G01N 21/61; G01N 21/474; G01N 21/05; G01N 27/4065; G01N 2021/0346; G01N 21/552; G01N 2201/12761; G01N 2201/12784; G01N 29/022; G01N 2021/399; G01N 2021/653; G01N 21/65; G01N 2291/0256; G01N 29/036; G01N 1/2205; G01N 2021/1723; G01N 21/1717; G01N 21/33; G01N 21/73; G01N 21/8507; G01N 2291/0255; G01N 2291/0426; G01N 30/6095; G01N 30/7266; G01N 1/2273; G01N 2001/2288; G01N 2021/8645; G01N 21/86; G01N 2201/0236; G01N 2201/0612; G01N 2201/127; G01N 33/0004; G01N 19/00; G01N 2001/028; G01N 2001/2244; G01N 2001/4088; G01N 21/01; G01N 21/67; G01N 2203/0087; G01N 2291/02466; G01N 2291/02827; G01N 27/226; G01N 29/14; G01N 29/46; G01N 3/40; G01N 33/02; G01N 33/2823; G01N 33/497; G01N 33/66; G01N 33/6896; G01N 33/70; G01N 1/4077; G01N 15/0255; G01N 2021/0112; G01N 21/031; G01N 21/15; G01N 21/41; G01N 21/45; G01N 2333/245; G01N 27/127; G01N 27/4148; G01N 2800/347; G01N 29/2406; G01N 30/7233; G01N 33/0037; G01N 33/491; G01N 33/493; G01N 33/5038; G01N 33/5091; G01N 33/56938; G01N 1/24; G01N 1/28; G01N 11/04; G01N 15/02; G01N 15/0618; G01N 15/08; G01N 2001/2223; G01N 2001/227; G01N 2001/2276; G01N 2015/084; G01N 2021/157; G01N 2021/158; G01N 2021/3129; G01N 2021/3148; G01N 2021/3177; G01N 2021/3595; G01N 2021/6484; G01N 2021/8822; G01N 2030/027; G01N 2030/642; G01N 2035/00881; G01N 21/00; G01N 21/0303; G01N 21/276; G01N 21/293; G01N 21/3577; G01N 21/3581; G01N 21/4738; G01N 21/59; G01N 21/63; G01N 21/9501; G01N 21/95623; G01N 2201/0221; G01N 2201/06113; G01N 2201/0675; G01N 2291/0423; G01N 2291/106; G01N 2333/195; G01N 2333/255; G01N 2333/4626; G01N 2333/4722; G01N 2333/515; G01N 2333/76; G01N 2333/96461; G01N 2500/00; G01N 27/06; G01N 27/07; G01N 27/22; G01N 27/3275; G01N 27/48; G01N 2800/102; G01N 2800/52; G01N 29/041; G01N 29/12; G01N 29/222; G01N 29/36; G01N 3/16; G01N 30/64; G01N 30/7206; G01N 31/16; G01N 33/14; G01N 33/146; G01N 33/18; G01N 33/487; G01N 33/49; G01N 33/4905; G01N 33/492; G01N 33/564; G01N 33/56911; G01N 33/56916; G01N 33/57492; G01N 33/582; G01N 33/6812; G01N 33/6827; G01N 33/6869; G01N 33/6887; G01N 33/6893; G01N 33/721; G01N 33/92; G01N 35/00871; G02B 5/1819; G02B 5/1842; G02B 19/0028; G02B 19/0066; G02B 27/0927; G02B 27/0961; G02B 27/0966; G02B 27/0994; G02B 5/021; G02B 5/0278; G02B 6/0006; G02B 6/0008; G02B 26/001; G02B 6/29395; G02B 6/29361; G02B 6/29398; G02B 26/02; G02B 6/29358; G02B 6/4225; G02B 6/4249; G02B 1/11; G02B 1/12; G02B 6/1221; G02B 6/1225; G02B 6/32; G02B 1/02; G02B 1/045; G02B 26/0833; G02B 6/4226; G02B 6/4238; G02B 27/62; G02B 6/3636; G02B 6/3656; G02B 6/4237; G02B 7/003; G02B 6/29365; G02B 6/29383; G02B 6/327; G02B 6/3644; G02B 6/4215; G02B 5/288; G02B 6/4201; G02B 6/4256; G02B 2006/12104; G02B 26/0816; G02B 26/0841; G02B 5/208; G02B 6/266; G02B 6/3696; G02B 2006/12121; G02B 6/12007; G02B 6/2931; G02B 6/4203; G02B 26/085; G02B 6/353; G02B 6/3692; G02B 6/4246; G02B 5/284; G02B 6/264; G02B 6/29311; G02B 6/29359; G02B 6/3586; G02B 6/3845; G02B 6/4243; G02B 6/4259; G02B 6/4266; G02B 13/0045; G02B 6/3512; G02B 6/357; G02B 6/3594; G02B 6/4206; G02B 6/4214; G02B 9/62; G02B 27/017; G02B 6/02042; G02B 6/124; G02B 6/356; G02B 6/3584; G02B 6/4204; G02B 6/4224; G02B 6/4239; G02B 2027/0138; G02B 2027/0178; G02B 26/007; G02B 5/20; G02B 6/262; G02B 6/2861; G02B 6/29302; G02B 6/2938; G02B 6/3552; G02B 6/3817; G02B 6/3895; G02B 6/4202; G02B 6/421; G02B 6/4292; G02B 7/008; G02B 2207/129; G02B 27/58; G02B 5/124; G02B 5/26; G02B 5/28; G02B 5/3025; G02B 12/021; G02B 6/12033; G02B 6/2808; G02B 6/3502;

G02B 6/3514; G02B 6/3518; G02B 6/4251; G02B 6/4257; G02B 6/4265; G02B 6/4271; G02B 6/4286; G02B 7/006; G02B 1/005; G02B 26/00; G02B 26/023; G02B 26/0858; G02B 5/12; G02B 6/02176; G02B 6/12004; G02B 6/12011; G02B 6/24; G02B 6/26; G02B 6/29314; G02B 6/29368; G02B 6/29385; G02B 6/29389; G02B 6/3546; G02B 6/358; G02B 6/3616; G02B 6/3825; G02B 6/4244; G02B 7/025; G02B 7/1822; G02B 26/08; G02B 26/0808; G02B 26/0825; G02B 26/0875; G02B 26/101; G02B 27/104; G02B 27/145; G02B 5/201; G02B 6/1226; G02B 6/1228; G02B 6/293; G02B 6/29362; G02B 6/29376; G02B 6/29391; G02B 6/29394; G02B 6/3526; G02B 6/3548; G02B 6/3556; G02B 6/3572; G02B 6/3576; G02B 6/3578; G02B 6/423; G02B 6/424; G02B 6/4285; G02B 1/002; G02B 1/041; G02B 17/023; G02B 19/0019; G02B 2207/101; G02B 2207/117; G02B 23/2469; G02B 23/26; G02B 26/06; G02B 27/0006; G02B 27/0068; G02B 27/01; G02B 27/1006; G02B 27/16; G02B 27/30; G02B 3/14; G02B 30/34; G02B 5/08; G02B 5/1866; G02B 5/207; G02B 5/281; G02B 5/286; G02B 6/02004; G02B 6/02085; G02B 6/0288; G02B 6/12; G02B 6/12023; G02B 6/1203; G02B 6/125; G02B 6/2713; G02B 6/2766; G02B 6/2821; G02B 6/29307; G02B 6/29313; G02B 6/29322; G02B 6/29326; G02B 6/29328; G02B 6/29337; G02B 6/29356; G02B 6/29367; G02B 6/34; G02B 6/3508; G02B 6/352; G02B 6/3524; G02B 6/3532; G02B 6/3534; G02B 6/3542; G02B 6/355; G02B 6/3568; G02B 6/3598; G02B 6/362; G02B 6/3652; G02B 6/3803; G02B 6/42; G02B 6/422; G02B 9/12; G02B 9/02091; G02B 9/02004; G02B 9/02069; G02B 9/02067; G02B 9/02044; G02B 9/02051; G02B 2290/70; G02B 9/02007; G02B 11/00; G02B 11/24; G02B 11/2513; G02B 9/02097; G02B 2290/65; G02B 9/02027; G02B 9/02049; G02B 2290/35; G02B 9/02087; G01J 3/501; G01J 2003/468; G01J 3/02; G01J 3/0224; G01J 3/50; G01J 3/51; G01J 3/513; G01J 3/524; G01J 3/26; G01J 3/28; G01J 3/0256; G01J 3/10; G01J 3/2823; G01J 3/36; G01J 2003/1247; G01J 3/0218; G01J 2003/1213; G01J 3/027; G01J 3/12; G01J 3/2803; G01J 3/42; G01J 2003/2826; G01J 3/0264; G01J 3/108; G01J 3/0291; G01J 3/06; G01J 3/4338; G01J 1/0411; G01J 5/046; G01J 5/44; G01J 3/0229; G01J 3/32; G01J 2003/068; G01J 3/44; G01J 1/0214; G01J 1/0228; G01J 1/0252; G01J 1/0414; G01J 1/0488; G01J 1/08; G01J 1/22; G01J 1/32; G01J 1/42; G01J 1/4257; G01J 2001/086; G01J 2001/4238; G01J 2003/1286; G01J 2003/2806; G01J 3/0202; G01J 3/0286; G01J 3/0294; G01J 3/427; G01J 2005/0077; G01J 3/0205; G01J 3/0297; G01J 3/1256; G01J 3/18; G01J 5/20; G01J 5/48; G01J 5/60; G01J 1/4204; G01J 2003/2833; G01J 2005/202; G01J 3/0275; G01J 3/447; G01J 5/08; G01J 5/0837; G01J 1/0407; G01J 1/4228; G01J 2003/1226; G01J 2003/425; G01J 3/0208; G01J 3/021; G01J 3/0213; G01J 3/0232; G01J 3/0272; G01J 3/0289; G01J 3/433; G01J 5/00; G01J 5/02; G01J 5/024; G01J 5/0809; G01J 5/0825; G01J 5/0853; G01J 5/0862

See application file for complete search history.

(56) References Cited

U.S. PATENT DOCUMENTS

| | | | |
|---|---|---|---|
| 5,696,591 A * | 12/1997 | Bilhorn | G01N 21/8903 250/559.03 |
| 6,743,337 B1 * | 6/2004 | Ischdonat | D21G 9/0009 162/198 |
| 8,148,690 B2 | 4/2012 | Sturm et al. | |
| 2003/0090653 A1 * | 5/2003 | Ogata | G01N 21/8916 356/237.2 |
| 2005/0264808 A1 | 12/2005 | Wang | |
| 2006/0132796 A1 * | 6/2006 | Haran | G01N 33/346 356/503 |
| 2007/0008538 A1 * | 1/2007 | Kiraly | G01N 21/896 356/430 |
| 2007/0153281 A1 * | 7/2007 | Gordon | G01N 21/31 356/419 |
| 2008/0062422 A1 * | 3/2008 | Thomas | G01N 21/896 356/432 |
| 2009/0067774 A1 * | 3/2009 | Magnusson | H01S 5/423 385/10 |
| 2010/0188017 A1 * | 7/2010 | Brukilacchio | G02B 5/0278 315/294 |
| 2011/0007313 A1 | 1/2011 | Haran et al. | |
| 2013/0021669 A1 * | 1/2013 | Xi | B82Y 20/00 359/578 |
| 2013/0113919 A1 * | 5/2013 | Qiao | G01N 21/95 348/92 |
| 2016/0282279 A1 * | 9/2016 | Ribnick | G01N 21/8983 |
| 2017/0241915 A1 * | 8/2017 | Zwerger | G01N 21/8901 |
| 2018/0114308 A1 * | 4/2018 | Herrmann | G06T 7/0004 |

OTHER PUBLICATIONS

International Preliminary Report on Patentability Application No. PCT/Ep2018/083669 Completed: Mar. 31, 2020; dated Mar. 31, 2020 7 pages.

International Search Report and Written Opinion of the International Searching Authority Application No. PCT/EP2018/083669 Completed: Feb. 5, 2019; dated Feb. 14, 2019 15 pages.

Written Opinion of the International Searching Authority Application No. PCT/EP2018/083669 dated Dec. 17, 2019 4 pages.

* cited by examiner

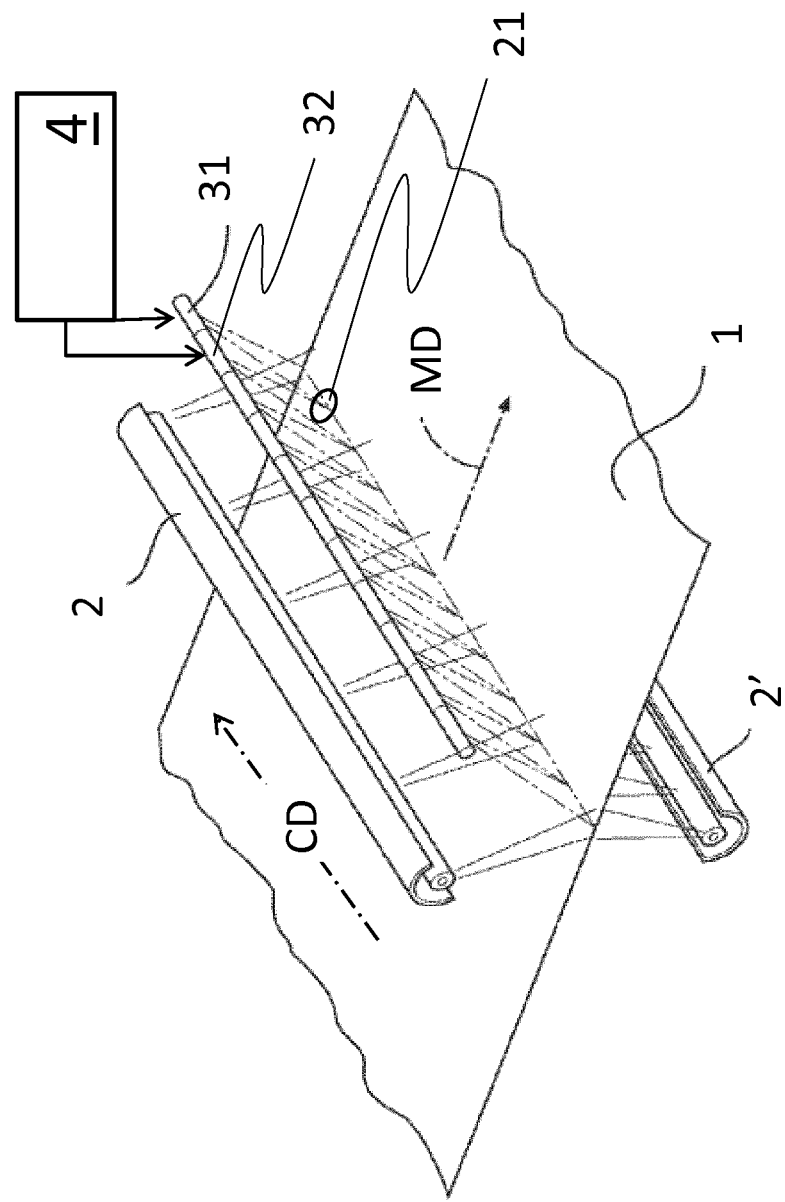

METHOD AND SYSTEM FOR REAL-TIME WEB MANUFACTURING SUPERVISION

TECHNICAL FIELD

The invention pertains to the field of web manufacturing. In particular, it relates to a system and a method for real-time web manufacturing supervision based on transmission, reflection and/or absorption measurements in accordance with the independent patent claims.

BACKGROUND

Web manufacturing refers to production and/or processing of, in general, long, thin sheets of bendable, flexible and/or soft material, in particular paper, cardboard, textile, plastic film, foil, (sheet) metal, and sometimes wire, commonly referred to as web. During production or processing, a web is generally transported over rollers in a moving direction. Between processing stages, webs may be stored and transported as rolls also referred to as coils, packages and doffs. A final result of web manufacturing usually comprises sheets being separated from the web by cutting or otherwise separating in a cross direction perpendicular to the moving direction. A main reason for work with webs instead of sheets is economics. Webs, being continuous, may generally be produced and/or processed at higher speeds than sheets, without start-stop issues which are inherent to production and/or processing of sheets.

During the manufacture of webs, the webs are monitored by devices, which may be referred to herein as detectors or sensors interchangeably, that feedback information used to control manufacturing. Manual or automated process control systems may use this information. Sensors used in process control systems need to accurately measure properties of a quickly moving, fluttering web, while operating in a high humidity, dirty, hot and/or wet environment. Such sensors usually mount on measurement platforms that scan the sensors in a cross machine direction (CD) as the process web moves relatively rapidly in a machine direction (MD).

One specific challenge is full width sheet measurement of coating weight and moisture of a moving paper process and the control of the corresponding web manufacturing process (comprising, in particular, speed, actuators, coating blades, etc.) based on respective measurements. This coating weight can be measured in a number of ways, including
1) Using basis weight and moisture sensors to measure the base sheet downstream and upstream after coating to measure coated sheet. A difference in dry weight (basis weight less water weight) may then be used to measure the total coating.
2) Using x-ray sensors upstream and downstream to measure inorganic material coating the process.
3) Using infrared spectroscopy to determine relevant parameters of the coating To reduce a sensor count and scanner count in the machine, infrared is the favored technology. It is also favored to measure coating applied to top and bottom surfaces.

Infrared spectroscopic sensors are common monitoring devices for such control systems. These sensors measure the absorption of infrared radiation at specific wavelength bands, indicating a specific property's presence and/or magnitude. Specific characteristics that the sensors may measure include properties such as water, polymers, coating minerals, cellulose and other components of a web. A common application is the measurement of the fraction of water by weight (percent moisture) in a moving paper web during manufacturing.

Infrared spectroscopic sensor measurements utilize the differential absorption of various wavelength bands in the near infrared region, generally 0.75 µm to 10.0 µm, by water and other components of the web. Process controllers compare measurements of the transmission and/or reflection of infrared energy at one or more reference wavelengths to measurements of the transmission and/or reflection at one or more absorption wavelengths. In general, the reference wavelengths are selected for a relatively low absorption coefficient by as many of the components of the web as possible, and the absorption wavelengths are selected for a relatively high absorption coefficient. A number of different wavelength measurements may be used to determine and/or reject other interfering parameters, such as the mean optical path length through the web as a result of optical scattering.

Infrared radiation sensors, such as lead sulfide (PbS), lead selenide (PbSe) or Indium Gallium Arsenide (InGaAs) sensors, generally measure infrared energy in several spectral bands, making all measurements simultaneously with the measurements being representative of the same area of the moving process web. Simultaneous measurement generally requires multiple, spatially separated sensors, each of which detects infrared energy at one of the spectral bands of interest. Since the properties of the web that affect the various infrared wavelengths can vary over short distances on the web, any differences in the web areas presented to the sensors may result in measurement error. Simply placing the individual sensors proximate to each other is generally inadequate to meet accuracy requirements. The signals from these sensors may be mathematically combined to develop measurements of interest.

Indium Gallium Arsenide (InGaAs) sensors are generally preferred since lead salt sensors are more sensitive to temperature and thus require more frequent normalization to correct errors produced by temperature drift and sensor dark current. Almost all currently available web property measuring systems normalize sensor signals by using continuous chopping devices such as filter wheels, tuning forks, rotating blades, shutters or the like.

Infrared sensors are most commonly employed in combination with filter wheels or arrays of discrete filters and detectors. In particular, web property measurements are often made using discrete thin film interference filters either mounted on a filter wheel in front of a detector (to multiplex wavelengths in time) or in an array of filters and detectors to multiplex the wavelengths to different locations. However, traditional continuous chopping as described above reduces the measurement signal. At best, a beam having a sinusoidal chop has half the average energy of a beam that is not chopped.

U.S. Pat. No. 8,148,690 B2, e.g., describes a measurement system for a web manufacturing process wherein light transmitted through the sheet is spatially multiplexed simultaneously to three detectors covered by fixed wavelength interference filters by means of a fiber-optic block. Such spatial multiplexing becomes more complex when multiple components need to be measured, as a bigger fiber-optic assembly and multiple detectors are required, leading to an increase in both cost and complexity. It is also disadvantageous as signal is reduced, hence reducing signal-to-noise ratio. Also for mid-IR wavelengths, glass fiber is not fully suitable as it will attenuate significantly in this spectral region.

US 2007/153281 A1 discusses a spectroscopic sensor for measuring flat sheet product. The disclosed sensor uses a combination of spectrometers and single-channel detectors and filters together with a broadband source of illumination to optimally measure multiple properties of a flat sheet product. A spectrometer is used to measure over a spectral range where an easily configurable set of wavelength channels is needed and where the signal-to-noise ratios and spectral resolutions of the channels are consistent with the spectral range and number of pixels of the spectrometer; while one or more single channel detector and filter combinations are used to measure, with high signal-to-noise ratio, at specific wavelengths within or outside the spectral range of the spectrometer(s).

US 2005/0264808 A1 discloses a multi-order or multi-passband tunable filter e.g. acousto-optical filter or Fabry-Perot filter optically filters a signal from a sample. A wavelength dispersive element e.g. grating or holographic filter element, spectrally disperses the filtered sample signal. A detector is arranged to detect the dispersed signal from the wavelength dispersive element.

US 2011/0007313A1 discloses a sensor system for directly illuminating light onto a composition to produce detection radiation along a detection beam path for measuring parameters in the composition, comprises a high brightness light source, a unit for generating detection radiation from the high brightness light source, where the detection radiation has predetermined wavelength ranges to detect the parameters in the composition, a fiber optic radiation delivery system that delivers the detection radiation to an optical head comprising first optics and second optics.

SUMMARY

It is thus an objective of the invention to provide a method and a web manufacturing supervision system for monitoring properties of a web being transported in a moving direction during a web manufacturing process which overcome the disadvantages as discussed above.

This objective and other objectives are solved by a method and a system for web manufacturing supervision in accordance with the independent patent claims.

A method for monitoring properties of a web being transported in a moving direction during a web manufacturing process in accordance with the present invention comprises the steps of:
  a) illuminating a first spot on the web by means of a radiation source;
  b) tuning a first detector to receive signal radiation within a signal wavelength band;
  c) capturing signal radiation emanating from said first spot by means of said first detector;
  d) simultaneously capturing reference radiation emanating from said first spot by means of a second detector configured to receive radiation within a reference wavelength band;
  e) determining a property of the web at the first spot based on a signal quantity, in particular a signal intensity, of the signal radiation, and a reference quantity, in particular a reference intensity, of the reference radiation;
  f) repeating steps b) through e) several times, wherein a first wavelength band and a second wavelength band is alternatingly chosen as the signal wavelength band, with the first wavelength band, the second wavelength band and the reference wavelength band each being different from, preferably non-overlapping with, one another.

In step a) of the method in accordance with the invention, a first spot on the web is illuminated by means of a radiation source, in particular a black body radiation source, preferably a halogen bulb or lamp, which emits radiation over a continuous spectrum of wavelengths preferably comprising, in particular, infrared wavelengths. The first spot is preferably fixed, predetermined, and/or stationary in space, in particular in relation to the first and/or second detector and/or the radiation source; but moves relatively to the web as the web is being transported in the moving direction, in particular with a speed corresponding to a speed $V_{MD}$ with which the web is transported in a moving direction.

Due to the illumination with the radiation source, radiation will emanate from said first spot in a plurality of directions, in particular a plurality of first directions pointing away from the web on a first side of the web on which the radiation source is located, in particular due to reflection, refraction, and/or scattering of radiation from the radiation source. In addition, if the web is sufficiently thin and/or transparent within at least part of the continuous spectrum of wavelengths, radiation will also emanate from said spot in a plurality of second directions pointing away from the web on a second side of the web opposite the one on which the radiation source is located, in particular due to transmission of radiation from the radiation source.

Signal radiation within a first wavelength band selected as a signal wavelength band emanating from the illuminated first spot is captured by means of a tunable first detector, which may, in particular, be located on the first or second side of the web. Before the signal radiation is captured, said first detector has to be tuned to receive signal radiation within said signal wavelength band. That the first detector is tuned to the signal wavelength band may imply that said detector will not be sensitive to wavelengths outside said signal wavelength band, or at least that a sensitivity $s_{out, sig}$ of the detector to any wavelengths outside the signal wavelength band is significantly smaller than an average sensitivity $s_{avg, sig}$ or maximum sensitivity $s_{max, sig}$ to wavelengths inside the signal wavelength band, i.e. that at least $s_{out, sig} \ll s_{max, sig}$ or $s_{out, sig} \ll s_{avg, sig}$ is fulfilled, preferably $100 \cdot s_{out, sig} \ll s_{out, sig}$ or $100 \cdot s_{out, sig} \ll s_{avg, sig}$, at least for any wavelength emitted by the radiation source.

At least essentially at a same time as signal radiation is captured, reference radiation emanating from the illuminated first spot is also captured by means of a second detector configured, in particular tuned, to receive radiation within a reference wavelength band. That said second detector is configured to receive radiation within the reference wavelength band may, in analogy with the first detector, imply that said second detector will not be sensitive to wavelengths outside the reference wavelength band, or at least that a sensitivity $s_{out, ref}$ of said detector to wavelengths outside the reference wavelength band is significantly smaller than an average sensitivity $s_{avg, ref}$ or maximum sensitivity $s_{max, ref}$ to wavelengths inside the reference wavelength band, i.e. that at least $s_{out, ref} \ll s_{max, ref}$ or $s_{out, ref} \ll s_{avg, ref}$ is fulfilled, preferably $100 \cdot s_{out, ref} \ll s_{max, ref}$ or $100 \cdot s_{out, ref} \ll s_{avg, ref}$, at least for all wavelengths emitted by the radiation source.

That reference radiation and signal radiation emanating from the illuminated first spot are captured at least essentially at the same time may indicate that measurement equipment employed to capture reference radiation and signal radiation is adapted to capture said reference radiation and said signal radiation simultaneously within a maximum accuracy as provided for by or achievable with said measurement equipment. It may, additionally or alternatively, indicate that during a time interval t between measurements, the illuminated first spot does not move significantly with respect to the web. In particular, this may mean that for a characteristic dimension $d_{spot}$, in particular a diameter, of the illuminated first spot and a web that is transported in moving direction at velocity $V_{MD}$, $t \ll d_{spot}/V_{MD}$ holds, preferably $100 \cdot t \ll d_{spot}/V_{MD}$. The characteristic dimension of the first spot is preferably configured to be much smaller then characteristic dimensions of the web, in particular a width $w_{web}$ of the web in cross direction (CD), i.e. $d_{spot} \ll w_{web}$. While the radiation source may illuminate a substantially larger area, in particular the whole width and/or a whole unwound portion of the web, the dimensions of an area from which emanating radiation is captured may be accordingly restricted, and under such circumstances define the first spot.

Once both reference radiation and signal radiation have been captured, a property, in particular a first property, of the web at the first spot is determined based on signal quantity characteristic of the captured signal radiation, in particular a signal intensity of the signal radiation, and on a reference quantity characteristic of the captured reference radiation, in particular a reference intensity of the reference radiation. Intensity may, in particular, relate to a peak, average, or integrated intensity. The property may, in particular, be determined based on a ratio of the signal intensity and the reference intensity, as will be explained in more detail below.

Before, while or after the property of the web is determined, a second wavelength band is selected as signal wavelength band. The signal detector is tuned to the new, i.e. second, signal wavelength band, and the process as described above is repeated, i.e. signal radiation and reference radiation are captured again at least essentially at a (new) same time, and a property—in particular a second property, preferably different from the first property, of the web is determined based on quantities, in particular intensities, characteristic of the captured signal radiation in the second wavelength band, and the captured reference radiation.

Subsequently, the process as described above is preferably started over, with the signal detector being again tuned to the first wavelength band.

In summary, the process as described above is repeated several times, wherein a first wavelength band and a second wavelength band are alternatingly chosen as the signal wavelength band.

The process as described above allows to determine and/or monitor a plurality of properties by alternatingly selecting a first or a second wavelength bands as signal wavelength bands, which first and a second wavelength bands may also be changed or modified over time, in particular online, i.e. without having to interrupt the web manufacturing process.

Preferably, the first wavelength band, the second wavelength band and the reference wavelength band are all different from, preferably non-overlapping with, one another. Wavelength bands may, in particular, be characterized by a peak wavelength $\lambda_{peak}$ at which the respective detector exhibits maximum sensitivity $s_{max}$ with $s(\lambda) < s_{max}$ for all wavelengths $\lambda \neq \lambda_{peak}$ and a bandwidth $\Delta\lambda$ indicative of how fast the sensitivity decreases if a wavelength of radiation to be detected deviates from the peak wavelength $\lambda_{peak}$. In connection with the method and system in accordance with the present invention, narrow wavelength band are preferably used, for which sensitivity of a detector tuned to or otherwise set to the peak wavelength $\lambda_{peak}$ generally decays to less than 50% or less than 1/e for wavelengths below $\lambda_{peak}-\Delta\lambda/2$ and above $\lambda_{peak}+\Delta\lambda/2$, with $\lambda_{peak} \gg \Delta\lambda$.

The first and second wavelength bands may be chosen in dependence on what property or properties of the web are to be determined and/or monitored. An exemplary first property, in particular in web manufacturing of paper, tissue etc., is moisture, corresponding at least essentially to a water content, in particular a ratio or percentage of water contained in a specific portion of a product being manufactured.

To determine moisture, a signal wavelength band having a peak signal wavelength of $\lambda_{sig,\ peak} = \lambda_{sig,\ moist} = 1.96$ μm may preferably be selected, in particular as first wavelength band. At this peak wavelength, water has a strong local absorption maximum, allowing for easy detection and monitoring of water, and thus moisture, based on an amount, in particular an intensity, of reflected, scattered or transmitted radiation in the first wavelength band, which amount decreases as the ratio or percentage of water contained in the first illuminated spot increases.

To account for desired and/or undesired irregularities in the web being manufactured, which may also affect the amount, and in particular the intensity, of reflected, scattered, refracted or transmitted radiation in the first wavelength band, a reference wavelength band having a peak reference wavelength $\lambda_{ref,\ peak}$ different from the peak signal wavelength $\lambda_{sig,\ peak}$, albeit preferably with $\lambda_{sig,\ peak} \approx \lambda_{ref,\ peak}$, may be selected for capturing reference radiation emanating from the illuminated first spot by means of a second detector. A wavelength which is subject to relatively low absorption by water, and preferably at least a majority of components and/or constituents other than water and contained in the web, is preferably selected as peak reference wavelength $\lambda_{ref,\ peak}$, where an exemplary choice of $\lambda_{ref,\ peak} = 1.8$ μm has proven particularly useful for moisture determination and/or monitoring. Moisture may then be determined more accurately based on, in particular, a ratio of the intensity, of reflected, scattered or transmitted radiation in the first wavelength band and the intensity of reflected, scattered or transmitted radiation in the reference wavelength band. By taking into account reference radiation emanating from the illuminated first spot, other potential sources of error in determining and/or monitoring properties of interest may also be eliminated or at least reduced, in particular potential errors due to changes in or related to the radiation source, and/or inconsistencies in the illumination of the first spot on the web.

Another property of interest and an exemplary second property to be determined and/or monitored in particular during web manufacturing of paper is fiber content. Fibers, in particular cellulose fibers, may have an absorption maximum at $\lambda_{sig,\ fiber} = 2.1$ μm. A corresponding signal wavelength band having a peak wavelength of $\lambda_{peak} = \lambda_{sig,\ fiber} = 2.1$ μm may thus preferably be selected, in particular, as second wavelength band, thus allowing for determination and/or monitoring of a fiber content alongside moisture, based on an amount, in particular an intensity, of reflected, scattered, refracted or transmitted radiation in the second wavelength band, which amount decreases as the ratio or percentage of fiber contained in the first illuminated spot increase.

Desired and/or undesired irregularities in the web being manufactured may again affect the amount, and in particular the intensity, of reflected, scattered or transmitted radiation in the second wavelength band in a manner similar to the one described above for the first wavelength band.

Further properties of interest may be determined and/or monitored in a manner analogous to the ones described above for moisture and fiber content, by selecting appropriate wavelength bands as first and/or second wavelength band, or as additional signal wavelength bands to which the first detector may, in particular repeatedly, be tuned in addition to the first and second wavelength bands as described above. Exemplary further properties to be determined and/or monitored in particular during web manufacturing of paper are related to coating, and may in particular be indicative of a coating thickness, density, etc. Coatings may, in particular, be provided on, in particular laminated onto, the web to improve printability, and may comprise or consist of latex, synthetic rubber, chalk and/or $CaCO_3$. Wavelength bands having peak signal wavelength $\lambda_{sig, peak}=2.3$ µm or $\lambda_{sig, peak}=4.0$ µm have been found to be particular useful for determining and/or monitoring coating properties.

A single, constant, reference wavelength band as described above may be used for capturing reference radiation, in which case a simple, in particular non-tunable, detector adapted to capture radiation within a single, fixed wavelength band corresponding to the single constant reference wavelength may be used as second detector.

Alternatively, different reference wavelength bands may be used in combination with at least some signal wavelength bands, i.e. the reference wavelength band may be adapted along with the signal wavelength band, i.e. may be set, in particular to a third wavelength band and a fourth wavelength band in an alternating manner, and possibly to additional reference wavelength bands preferably in synchronicity with the first and second wavelength bands, and possibly additional signal wavelength bands, being selected as signal wavelength bands. To be able to adapt the reference wavelength band accordingly, a tunable detector is preferably used as second detector.

Adapting the reference wavelength band together with the signal wavelength band allows to even batter account for desired and/or undesired irregularities in the web being manufactured, and thus more accurately determine or monitor the property of the property of interest. In particular, for a signal wavelength band having a peak wavelength of $\lambda_{sig, peak}=2.3$ µm, a reference wavelength band having a peak wavelength of $\lambda_{ref, peak}=2.4$ µm has been found to be particularly suitable, whereas for a signal wavelength band having a peak wavelength of $\lambda_{sig, peak}=4.0$ µm, a reference wavelength band having a peak wavelength of $\lambda_{ref, peak}=3.5$ µm has been found to be particularly suitable.

As already indicated above, the first, second and possible additional wavelength bands, and/or the third or fourth wavelength band, may be discrete wavelength bands, with a difference between respective peak wavelengths $\lambda_{peak}$ being larger, in particular much larger, than a bandwidth $\Delta\lambda$ of at least one of said wavelength bands. In this case, tuning the tunable first detector to the first, second and possible additional wavelength bands, and/or the tunable second detector to the third, fourth and possible additional wavelength bands may be done in a discontinuous manner, in particular by setting the respective wavelength bands in a step-wise manner under control of appropriately adapted control means.

The tunable first detector may also be tuned to the first, second and possible additional wavelength bands in or as part of a continuous wavelength sweep or scan. In this case, the respective peak wavelengths $\lambda_{peak}$ may differ only infinitesimally, i.e. for a difference $\varepsilon$ between respective peak wavelengths $\lambda_{peak}$, $\varepsilon \ll \Delta\lambda$, preferably $100 \cdot \varepsilon \ll \Delta\lambda$, may be fulfilled for a bandwidth $\Delta\lambda$ of at least one of the wavelength bands. In an analogous manner, if a tunable detector is used as second detector, said second detector may be tuned to the third, fourth and possible additional wavelength bands in or as part of a continuous wavelength sweep or scan.

A first broadband radiation sensor in combination with a first tunable filter, preferably a first tunable micro-electromechanical system (MEMS) filter, may be used as tunable first detector, wherein the tunable first filter is tuned to the first wavelength band, the second wavelength band, and, where applicable, additional wavelength bands to prevent radiation having wavelengths outside the respective wavelength band to impinge onto the broadband radiation sensor. Similarly, a second broadband radiation sensor in combination with a second tunable filter, preferably a second MEMS filter, may be used as tunable second detector, and be tuned to the third wavelength band, the fourth wavelength band, and, where applicable, additional wavelength bands. Filter and detector may be setup in a transmission setup, wherein wavelengths outside the respective wavelength band are not transmitted through the filter, in particular are absorbed and/or reflected, and will thus not reach the detector. Filter and detector may be setup in a reflection setup, wherein wavelengths outside the respective wavelength band are not reflected by the filter, in particular are absorbed and/or transmitted, and will thus not reach the detector.

In embodiments of the method in accordance with the invention, the web is transported in moving direction only by a small amount between successive measurements based on signal radiation captured within the first wavelength band and the second wavelength band. More specifically, during a time required to tune the first detector to the first and/or second wavelength band, in particular from the first to the second wavelength band or vice versa, a distance d by which the web is transported in moving direction is smaller than the width $w_{web}$ of the web in cross direction, i.e. $d<w_{web}$, in particular $d \ll w_{web}$. In addition or alternatively, a distance d by which the web is transported in moving direction may be smaller than 0.5 m, preferably smaller than 0.1 m, where $d \ll 0.1$ m may hold.

A web manufacturing supervision system for monitoring properties of a web being transported in a moving direction during a web manufacturing process in accordance with the present invention comprises:
  a) a radiation source for illuminating a first spot on the web;
  b) a tunable first detector for capturing signal radiation emanating from said first spot within a signal wavelength band; said signal wavelength band being adjustable to one of at least a first wavelength band and a second wavelength band in accordance with a first tuning setting;
  c) a second detector for simultaneously capturing reference radiation emanating from said first spot within a reference wavelength band;
  d) control means for alternatingly and repeatedly, in particular periodically, tuning the signal wavelength band to the first wavelength band and the second wavelength band.

The web manufacturing supervision system in accordance with the invention as described above allows to determine and/or monitor a plurality of properties by selecting appropriate first and a second wavelength band as signal wavelength bands, which first and a second wavelength bands may also be changed or modified over time, in particular online, i.e. without having to interrupt the web manufacturing process.

The web manufacturing supervision system in accordance with the invention as described above may in particular be used and/or configured to carry out the method in accordance with the invention as described further above, where one or more of the aspects as described for the method may also apply to the web manufacturing supervision system.

In particular, a first broadband radiation sensor in combination with a first tunable filter, preferably a first tunable micro-electromechanical system (MEMS) filter, may be provided as tunable first detector, wherein the tunable first filter is tuned to the first wavelength band, the second wavelength band, and, where applicable, additional wavelength bands to prevent radiation having wavelengths outside the respective wavelength band to impinge onto the broadband radiation sensor. The second detector may also be a tunable detector, wherein a second broadband radiation sensor in combination with a second tunable filter, preferably a second MEMS filter, may be provided as tunable second detector, tuned to the third wavelength band, the fourth wavelength band, and, where applicable, additional wavelength bands. Filter and detector may be setup in a either a transmission or a reflection setup.

Unless stated otherwise, it shall be assumed throughout this entire document that a statement a≈b implies that $|a-b|/(|a|+|b|)<10^{-1}$, preferably $|a-b|/(|a|+|b|)<10^{-2}$, wherein a and b may represent arbitrary variables as described and/or defined anywhere in this document, or as otherwise known to a person skilled in the art. Further, a statement that a is at least approximately equal or at least approximately identical to b implies that a≈b, and may, in particular, also imply that a equals b, i.e. a=b. Further, unless stated otherwise, it shall be assumed throughout this entire document that a statement a>>b or "a is much larger than b" implies that a>10b, preferably a>100b; and statement a b or "a is much smaller than b" implies that 10a<b, preferably 100a<b.

The aspects as described above as well as further aspects of the invention will become apparent from and elucidated with reference to the embodiments described hereinafter.

BRIEF DESCRIPTION OF THE DRAWINGS

The subject matter of the invention will be explained in more detail in the following text with reference to exemplary embodiments which are illustrated in the attached drawings, of which:

FIG. 1 illustrates a web manufacturing supervision system inspection system which may be used for applying the method in accordance with the present invention to a web manufacturing process.

DETAILED DESCRIPTION

FIG. 1 illustrates an exemplary embodiment of a web manufacturing supervision system which may be used for applying the method in accordance with the invention to a web manufacturing process.

During said web manufacturing process, a web 1 is transported in a moving direction MD perpendicular to a cross direction CD. An infrared lamp 2 as a radiation source is mounted above the web, and illuminates a first spot 21 on the web. A tunable first detector 31 and a tunable second detector 32 for capturing radiation emanating from said first spot is also mounted above A controller 4 is provided as a control means for tuning the tunable first detector to detect radiation in a first wavelength band having a peak wavelength of $\Delta_{1, peak}$=1.96 μm and to detect radiation in a second wavelength band having peak signal wavelength of $\lambda_{2, peak}$=2.1 μm, and configured to alternatingly and repeatedly, in particular periodically switch between the first and second wavelength band.

The controller 4 also acts as a control means for the tunable second detector 32, and is configured to tune said tunable second detector 32 to a reference wavelength band having a peak signal wavelength of $\lambda_{ref, peak}$=1.8 μm.

In addition or alternatively to infrared lamp 2, second infrared lamp 2' may be provided below the web to illuminate the first spot 21.

This description and the accompanying drawings that illustrate aspects and embodiments of the present invention should not be taken as limiting the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below The disclosure also covers all further features shown in the FIGURE, individually although they may not have been described in the afore or following description. Also, individual alternatives of the embodiments described in the FIGURE and the description and individual alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. A method for monitoring properties of a web being transported in a moving direction during a web manufacturing process, the method comprising the steps of:
   a) illuminating a first spot on the web by means of a radiation source;
   b) tuning a first detector to receive signal radiation within a signal wavelength band;
   c) capturing signal radiation emanating from said first spot by means of said first detector;

d) simultaneously capturing reference radiation emanating from said first spot by means of a second detector configured to receive radiation within a reference wavelength band;
e) determining a property of the web at the first spot based on a signal quantity, in particular a signal intensity, of the signal radiation, and a reference quantity, in particular a reference intensity, of the reference radiation;
f) repeating steps b) through e) several times, wherein a first wavelength band and a second wavelength band is alternatingly chosen as the signal wavelength band, with the first wavelength band, the second wavelength band and the reference wavelength band each being different from, preferably non-overlapping with, one another,
wherein as steps b) through e) are repeated, a third wavelength band and a fourth wavelength band is alternatingly chosen as the reference wavelength band, and wherein a tunable detector is used as the second detector with said tunable second detector tuned to the respective reference wavelength band in or prior to step d); and wherein the first through fourth wavelength bands each being different from, preferably non-overlapping with, one another.

2. The method according to claim 1, wherein a tunable detector is used as first detector, which tunable detector includes a broadband radiation sensor and a tunable filter, preferably a tunable micro-electromechanical system (MEMS) filter, and wherein the tunable filter is alternatingly tuned to the first wavelength band and the second wavelength band to prevent radiation having wavelengths outside the respective wavelength band to impinge onto the broadband radiation sensor.

3. The method according to claim 1 wherein, the web is transported in moving direction by a distance d smaller, preferably much smaller, than a width $w_{web}$ of the web.

4. The method according to claim 1, wherein, the web is transported in moving direction by a distance d smaller than 0.5 m, preferably smaller than 0.1 m, 0.05 m, or 0.01 m.

5. The method according to claim 1, wherein a black body radiation source, preferably a halogen lamp, is used for illuminating the first spot on the web in step a).

6. A web manufacturing supervision system for monitoring properties of a web being transported in a moving direction during a web manufacturing process, said system comprising:
a radiation source for illuminating a first spot on the web;
a tunable first detector for capturing signal radiation emanating from said first spot within a signal wavelength band; said signal wavelength band being adjustable to one of at least a first wavelength band and a second wavelength band in accordance with a first tuning setting;
a second detector for simultaneously capturing reference radiation emanating from said first spot within a reference wavelength band;
a controller for alternatingly and repeatedly, in particular periodically, tuning the signal wavelength band to the first wavelength band and the second wavelength band, wherein the second detector is tunable, with the reference wavelength band being adjustable to one of at least a third wavelength band and a fourth wavelength band in accordance with a second tuning setting, and wherein the controller is further configured to alternatingly and repeatedly, in particular periodically, adjust the reference wavelength band to the third wavelength band and the fourth wavelength band; and wherein the first through fourth wavelength bands are each different from, preferably non-overlapping with, one another.

7. The web manufacturing supervision system according to claim 6, wherein the tunable first detector comprises a broadband radiation sensor and a filter assembly, said filter assembly including a tunable filter, preferably a tunable MEMS filter, tunable to at least the first wavelength band and the second wavelength band, said filter assembly configured to prevent radiation having wavelengths outside the tuned wavelength band to impinge onto the detector.

8. The web manufacturing supervision system according to claim 6, wherein the controller is configured to alternatingly and repeatedly tune the signal wavelength while the web moves in moving direction by a distance d smaller, preferably much smaller than a width $w_{web}$ of the web.

9. The web manufacturing supervision system according to claim 6, wherein the controller is configured to alternatingly and repeatedly tune the signal wavelength while the web moves in moving direction by a distance d smaller than 0.5 m, preferably smaller than 0.1 m, 0.05 m, or 0.01 m.

10. The web manufacturing supervision system according to claim 6, the system being configured to carry out a method comprising the steps of:
a) illuminating said first spot on the web by means of said radiation source;
b) tuning said first detector to receive signal radiation within said signal wavelength band;
c) capturing signal radiation emanating from said first spot by means of said first detector;
d) simultaneously capturing reference radiation emanating from said first spot by means of said second detector configured to receive radiation within said reference wavelength band;
e) determining a property of the web at the first spot based on a signal quantity, in particular a signal intensity, of the signal radiation, and a reference quantity, in particular a reference intensity, of the reference radiation;
f) repeating steps b) through e) several times, wherein said first wavelength band and said second wavelength band is alternatingly chosen as the signal wavelength band, with the first wavelength band, the second wavelength band and the reference wavelength band each being different from, preferably non-overlapping with, one another,
wherein as steps b) through e) are repeated, said third wavelength band and said fourth wavelength band is alternatingly chosen as the reference wavelength band, and wherein said tunable second detector is tuned to the respective reference wavelength band in or prior to step d); and wherein the first through fourth wavelength bands each being different from, preferably non-overlapping with, one another.

11. The method according to claim 2 wherein, the web is transported in moving direction by a distance d smaller, preferably much smaller, than a width $w_{web}$ of the web.

12. The method according to claim 2, wherein, the web is transported in moving direction by a distance d smaller than 0.5 m, preferably smaller than 0.1 m, 0.05 m, or 0.01 m.

13. The method according to claim 2, wherein a black body radiation source, preferably a halogen lamp, is used for illuminating the first spot on the web in step a).

14. The web manufacturing supervision system according to claim 7, wherein the controller is configured to alternatingly and repeatedly tune the signal wavelength while the web moves in moving direction by a distance d smaller, preferably much smaller than a width $w_{web}$ of the web.

15. The web manufacturing supervision system according to claim 7, wherein the controller is configured to alternatingly and repeatedly tune the signal wavelength while the web moves in moving direction by a distance d smaller than 0.5 m, preferably smaller than 0.1 m, 0.05 m, or 0.01 m.

16. The web manufacturing supervision system according to claim 7, the system being configured to carry out a method comprising the steps of:
- a) illuminating said first spot on the web by means of said radiation source;
- b) tuning said first detector to receive signal radiation within said signal wavelength band;
- c) capturing signal radiation emanating from said first spot by means of said first detector;
- d) simultaneously capturing reference radiation emanating from said first spot by means of said second detector configured to receive radiation within said reference wavelength band;
- e) determining a property of the web at the first spot based on a signal quantity, in particular a signal intensity, of the signal radiation, and a reference quantity, in particular a reference intensity, of the reference radiation;
- f) repeating steps b) through e) several times, wherein said first wavelength band and said second wavelength band is alternatingly chosen as the signal wavelength band, with the first wavelength band, the second wavelength band and the reference wavelength band each being different from, preferably non-overlapping with, one another, wherein as steps b) through e) are repeated, said third wavelength band and said fourth wavelength band is alternatingly chosen as the reference wavelength band, and wherein said tunable second detector is tuned to the respective reference wavelength band in or prior to step d); and wherein the first through fourth wavelength bands each being different from, preferably non-overlapping with, one another.

* * * * *